May 25, 1965  N. E. RUHL  3,184,879
FISHING AND TROLLING ROD
Filed March 18, 1964
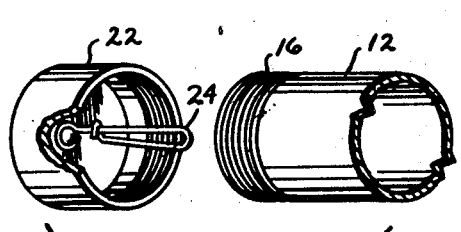
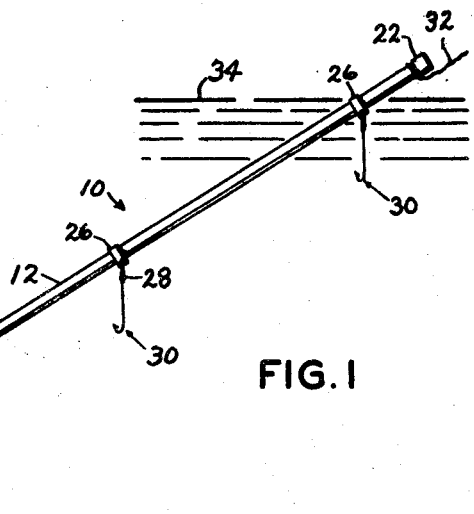
FIG. 4
FIG. 1
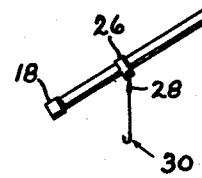
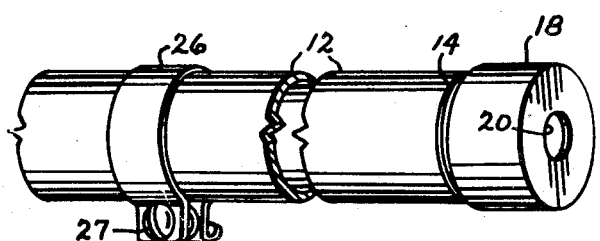
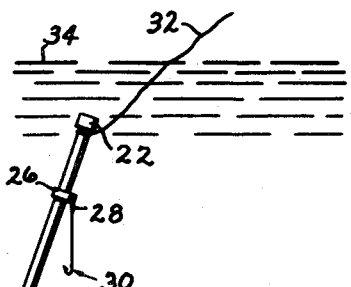
FIG. 3
FIG. 2
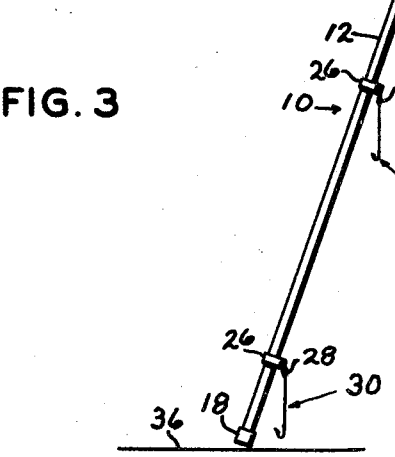
NOAH E. RUHL
INVENTOR.
BY
Robert K. Rhea
AGENT

United States Patent Office 3,184,879
Patented May 25, 1965

3,184,879
FISHING AND TROLLING ROD
Noah E. Ruhl, Rte. 2, Box 136, Oklahoma City, Okla.
Filed Mar. 18, 1964, Ser. No. 352,743
1 Claim. (Cl. 43—42.74)

The present invention relates to an improved device adapted to be connected to a fishing line so that it may be satisfactorily employed, at the discretion of the fisherman, as a float or a sinker or in partially submerged position.

It is desirable, when fishing, to provide a device which will support the baited hooks in spaced relation with each other and with respect to the bottom of the body of water and to provide movement to the bait so that fish will be attracted thereto. At other times is is desirable to position the baited hooks on or near the bottom of the body of water.

It is, therefore, the principal object of the instant invention to provide a buoyant body which will float on or near the surface of the water and which may be adjusted so that the body will be positioned and float in an inclined position with respect to the surface of the water.

Another object is to provide a floating and trolling fishing device to which a plurality of hooks may be connected in spaced-apart relation so that the hooks and baits will not become entangled while fishing.

Another object is to provide a fishhook supported buoyant body which may be used as a trolling rod at a desired elevation below the surface of the water wherein the inherent buoyancy of the body, in contacting obstructions within the water, imparts a bouncing action to the rod and the baited fishhooks.

Still another object is to provide a buoyant hollow body having means at one end thereof for supporting fishhooks and leaders within the hollow body when the latter is not in use.

A still further object is to provide a fishhook holding body which may be charged with water and used as a sinker for fishing on the bottom.

The present invention accomplishes these and other objects by providing an elongated hollow tubular member having threads at its opposite ends. A removable cap closes one end of the body while a centrally apertured cap is secured to its other end. Means connected with the body removably support a plurality of snelled fishhooks in spaced-apart relation.

Other objects will be apparent from the following description when taken in conjunction with the accompanying single sheet of drawings, wherein:

FIGURES 1 and 2 are side elevational views, respectively, illustrating the device in different fishing positions;

FIGURE 3 is a fragmentary perspective view of one end portion of the device; and, FIGURE 4 is a fragmentary exploded perspective view of the opposite end portion of the device.

Like characters of reference designate like parts in those figures of the drawings in which they occur.

In the drawings:

The reference numeral 10 indicates the device, as a whole, comprising an elongated tubular body or member 12, preferably formed of light colored metallic material and having external threads 14 and 16 at its respective ends. The material and size of the tubular member may be varied as desired but I have found that a one inch diameter aluminum tube six feet long is satisfactory. A cap 18 is threadedly engaged with the threads 14. The closed end of the cap 18 is provided with a central aperture 20 for the purpose which will presently be explained.

The other end of the tube 12 is closed by a second cap 22 engaged with the threads 16. A clip 24 is secured at one end to the inner surface of the closed end of the cap 22. A plurality of clamps such as garden hose clamps 26 surround the tube 12 in longitudinally spaced-apart fiexed relation. Each of the clamps 26 is provided with a clamp bolt 27. A fishhook receiving clip 28 is connected to the respective clamp bolt 27. The clip 28 may include a swivel, not shown. A snelled fishhook 30 is connected to the respective clip 28. The spacing between the clamps 26 and the length of the respective snelled fishhook 30, connected to the respective clip 28, is such that the fishhooks will not become entangled with each other during fishing operations.

When using the device the fisherman connects a fishing line 32 to the end portion of the tube closed by the cap 22 and baits the fishhooks. The end portion of the tube having the cap 22 thereon is manually held and the end portion of the tube having the cap 18 thereon is inserted into the water, indicated by the lines 34, until a selected quantity of water enters the depending end portion of the tube 12 through the opening 20. Thereafter the tube is released and allowed to float in the water 34 in substantially the position shown by FIG. 1. In this position the device may be pulled by a boat for trolling. Movement of the device 10 through the water, when in this position, imparts an erratic movement to the tube 12 and baited fishhooks 30. Similarly, the buoyancy of the tube, when the latter contacts an obstruction, not shown, in the water causes the entire device 10 to bounce over the obstruction. Similarly the interior of the tube 12 may be charged with smaller quantity of water so the tube 12 will maintain floating characteristics adjacent the surface of the water.

Alternatively the tube may be manually held until sufficient water has entered and charged the tube 12, through the opening 20, so that the water in this end portion of the tube will overcome the buoyancy of the end portion of the tube, closed by the cap 22, which causes the tube 12 to be positioned with the cap 18 in contact with the bottom of the body of water, indicated by the line 36 (FIG. 2). This positions one of the hooks 30 adjacent the bottom of the water, while the other two hooks are suspended in spaced relation thereabove. When it is desired to use the device as a sinker, the cap 22 is removed and the tube allowed to fill with water so that, when released, it sinks to the bottom of the body of water. It seems obvious that the apertured cap 18 may be removed and replaced with a second imperforate cap, like the cap 22, to seal the body 12 air and water tight so that the body will act as a float at the surface of the water. In this position all the hooks 30 are positioned at equal depths.

When the device is not in use, the cap 22 is removed and the snelled hooks 30 are removed from the clips 28 and attached to the clip 24. The hooks 30 are then introduced into the open end of the tube 12 and the cap 22 is replaced on the threads 16 thus preventing entanglement or snagging of the hooks 30.

Obviously the invention is susceptible to some change or alteration without defeating its practicability, and I therefore do not wish to be confined to the preferred em-

I claim:

A convertible float and sinker, comprising: an elongated imperforate tubular member having threads at its opposing ends; a centrally apertured cap removably engaged threadedly with one end of said tubular member; a second cap threadedly engaged with the other end of said tubular member, said second cap having a closed end; a clip secured to the inner surface of the closed end of said second cap; clamps surrounding said tubular member in spaced-apart relation intermediate its ends; and a clip secured to each said clamp for removably receiving snelled fiishhooks, said snelled fishhooks being optionally engagable with said first named clip for storage within said tubular member.

References Cited by the Examiner

UNITED STATES PATENTS

| | | | |
|---|---|---|---|
| 2,157,819 | 5/39 | Eckert | 43—43.15 |
| 2,445,523 | 7/48 | Goldbach | 43—42.06 |
| 2,551,998 | 5/51 | Groot | 43—42.74 XR |
| 2,910,800 | 11/59 | Cicala | 43—42.06 |

ABRAHAM G. STONE, *Primary Examiner*.